(12) United States Patent
Neti et al.

(10) Patent No.: US 11,932,122 B2
(45) Date of Patent: Mar. 19, 2024

(54) SYSTEM AND METHOD FOR PREDICTING MECHANICAL FAILURE

(71) Applicant: Transportation IP Holdings, LLC, Norwalk, CT (US)

(72) Inventors: Prabhakar Neti, Rexford, NY (US); Kevin Michael Jones, Lawrence Park, PA (US); Anthony Paul Fama, Lawrence Park, PA (US); Corey Jackson, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 734 days.

(21) Appl. No.: 17/094,945

(22) Filed: Nov. 11, 2020

(65) Prior Publication Data

US 2021/0061106 A1    Mar. 4, 2021

Related U.S. Application Data

(63) Continuation of application No. 14/869,478, filed on Sep. 29, 2015, now abandoned.

(51) Int. Cl.
*B60L 3/00* (2019.01)

(52) U.S. Cl.
CPC .................................. *B60L 3/0061* (2013.01)

(58) Field of Classification Search
CPC ..................................................... B60L 3/0061
See application file for complete search history.

(56) References Cited

U.S. PATENT DOCUMENTS

| 2010/0295491 A1* | 11/2010 | Schulz | G01R 31/346 180/65.285 |
| 2014/0167810 A1* | 6/2014 | Neti | G01R 31/343 324/765.01 |
| 2014/0284122 A1* | 9/2014 | Hirata | B60G 17/02 180/65.51 |
| 2016/0223431 A1* | 8/2016 | Summers | G01M 17/013 |
| 2017/0087990 A1* | 3/2017 | Neti | B60L 3/0061 |

OTHER PUBLICATIONS

Jeong et al, Y. Fault Detection and Fault-Tolerant Control of Interior Permanent-Magnet Motor Drive System for Electric Vehicle, Google Scholar, IEEE Transactions on Industry Applications, vol. 41, No. 1, Jan./Feb. 2005, pp. 46-51. (Year: 2005).*

* cited by examiner

*Primary Examiner* — Russell Frejd
(74) *Attorney, Agent, or Firm* — The Small Patent Law Group LLC; Christopher R. Carroll (57) ABSTRACT

A system and method for monitoring a motor of a vehicle system monitor operating conditions of the vehicle system and determine whether the operating conditions of the vehicle system match designated operating conditions. Responsive to determining that the operating conditions of the vehicle system that are monitored match the designated operating conditions, an electrical signature representative of an electric current supplied to the motor of the vehicle system is examined and damage to one or more of the motor of the vehicle system or a mechanical coupling of the motor to one or more of a wheel or axle of the vehicle system is identified based on the electrical signature that is examined.

20 Claims, 7 Drawing Sheets

SYSTEM AND METHOD FOR PREDICTING MECHANICAL FAILURE

CROSS-REFERENCE TO RELATED APPLICATIONS

This application is a continuation of U.S. patent application Ser. No. 14/869,478, which was filed on 29 Sep. 2015, and the entire disclosure of which is incorporated herein by reference.

FIELD

One or more embodiments of the subject matter described herein relate to systems for monitoring electric components, such as traction motors, alternators, transmission gearings, etc., of a vehicle. While certain embodiments are described in terms of traction motors of off-highway vehicles (OHV), such as mining vehicles or other vehicles that are not designed or not permitted for travel on public roadways, the subject matter described herein optionally may apply to other vehicles.

BACKGROUND

Known vehicles may include several electric motors, such as three-phase alternating current (AC) traction motors, that receive three-phase AC to power the motors. With respect to each motor, different phases of the current are passed to different conductive coils disposed in a stator of the motor. The current generates a magnetic field in the stator and causes a rotor of the motor to rotate within the stator. The rotor may be coupled with an axle or wheel of the vehicle by one or more gears or other couplings. Rotation of the rotor causes rotation of the axle and wheel to propel the vehicle.

Several mechanical components may be used to enable rotation of the rotor within the stator of the motor. For example, bearings may be disposed between the rotor and the stator to center the rotor in the stator and allow the rotor to rotate at relatively high speeds within the stator. Gears and/or other coupling components may be coupled with the rotor to translate rotation of the rotor to rotation of an axle or wheels. Over time, one or more of the bearings, gears, and/or other coupling components may begin to fail. For example, friction between a bearing and the rotor or stator, friction between gears, and/or friction between two or more other components of the motor may increase as the bearing, gear, or other component begins to mechanically fail. If the motor having the failing bearing, gear, or other component is not identified in time, the failing bearing, gear, or other component may seize or lock up and cause the motor to fail. Once the motor fails, the motor can no longer operate to propel the vehicle.

BRIEF DESCRIPTION

In one embodiment, a method (e.g., for monitoring a propulsion system of a vehicle system) includes monitoring operating conditions of the vehicle system, determining whether the operating conditions of the vehicle system match designated operating conditions, examining an electrical signature representative of an electric current supplied to the propulsion system of the vehicle system responsive to determining that the operating conditions of the vehicle system that are monitored match the designated operating conditions, and identifying damage to one or more of the propulsion system of the vehicle system or a mechanical coupling of the propulsion system to one or more of a wheel or axle of the vehicle system based on the electrical signature that is examined.

In another embodiment, another method (e.g., for monitoring a propulsion system of a vehicle system) includes monitoring operating conditions of the propulsion system of the vehicle system during a baseline time period, monitoring one or more electrical characteristics of current supplied to the propulsion system during the baseline time period, examining one or more electrical signatures of the propulsion system to identify at least one electrical signature having reduced variances in magnitude at one or more frequencies associated with damage to one or more of the propulsion system or a mechanical coupling of the propulsion system to one or more of a wheel or an axle of the vehicle system, and determining one or more sets of designated operating conditions of the propulsion system based on the one or more electrical signatures that are examined. The one or more sets of designated operating conditions are used to determine which of subsequently monitored electrical characteristics of the current are to be examined to identify the damage to the one or more of the propulsion system or the mechanical coupling of the propulsion system.

In another embodiment, a system (e.g., a monitoring system) includes one or more sensors and a controller. The one or more sensors are configured to measure operating conditions of a vehicle system. The controller is configured to determine whether the operating conditions of the vehicle system match designated operating conditions. The controller also is configured to examine an electrical signature representative of an electric current supplied to a propulsion system of the vehicle system responsive to determining that the operating conditions of the vehicle system that are monitored match the designated operating conditions. The controller also is configured to identify damage to one or more of the propulsion system of the vehicle system or a mechanical coupling of the propulsion system to one or more of a wheel or axle of the vehicle system based on the electrical signature that is examined.

In another embodiment, another system (e.g., a monitoring system) includes one or more sensors and a controller). The one or more sensors are configured to measure operating conditions of a propulsion system of a vehicle system during a baseline time period. The controller is configured to monitor one or more electrical characteristics of current supplied to the propulsion system during the baseline time period, and to examine one or more electrical signatures of the propulsion system to identify at least one electrical signature having reduced variances in magnitude at one or more frequencies associated with damage to one or more of the propulsion system or a mechanical coupling of the propulsion system to one or more of a wheel or an axle of the vehicle system. The controller is configured to determine one or more sets of designated operating conditions of the propulsion system based on the one or more electrical signatures that are examined. The one or more sets of designated operating conditions are used by the controller to determine which of subsequently monitored electrical characteristics of the current are to be examined to identify the damage to the one or more of the propulsion system or the mechanical coupling of the propulsion system.

BRIEF DESCRIPTION OF THE DRAWINGS

The subject matter described herein will be better understood from reading the following description of non-limiting embodiments, with reference to the attached drawings, wherein below.

DETAILED DESCRIPTION

Reference will be made below in detail to embodiments of the inventive subject matter, examples of which are illustrated in the accompanying drawings. Wherever possible, the same reference numerals used throughout the drawings refer to the same or like parts. Although example embodiments of the inventive subject matter are described with respect to three phase alternating current electric motors for vehicles, embodiments also may be applicable for use with electric motors generally.

At least one embodiment described herein relates to a system and method that monitors electric energy (e.g., electric current, voltage, inductance, or any combination thereof) that is supplied to a propulsion system in order to generate a motor electrical signature of the electrical energy. This signature can represent current and/or voltage spectra, which can be related to the defects in bearings, gears, or the like, included in the motor and/or that couple the motor with an axle or wheel. For example, a damaged bearing will produce several mechanical vibrations that are transformed into the electrical signatures of the traction motor. The magnitude of these mechanical vibrations for a given system will be very clear at certain operating conditions, such as certain designated motor speeds and torques.

These vibrations, however, may not be as clearly defined (relative to other areas of the signature). The vehicle system is operated to characterize one or more sets of designated operating conditions (e.g., sets of designated motor speeds and torques) where vibrations caused by faulty bearings or other mechanical faults of the motor (or associated with the motor) are more likely to appear in the signatures of the motor than at other operating conditions. During later operation, the voltage and/or current of one or more phases of current supplied to the motor is monitored during time periods that the vehicle system operates using one or more of the sets of designated operating conditions. These voltages and/or currents are used to generate voltage or current spectra, which represent electrical signatures of the motor at the designated operating conditions. The signatures associated with the voltages and/or currents obtained during operation at the designated operating conditions are examined in order to determine whether one or more vibrations or peaks in the signatures indicate damage to the motor (or associated bearings, gears, etc.).

The electrical signatures described herein include representations of one or more characteristics of the electrical energy supplied to a motor. For example, a motor electrical signature can be a frequency spectrum of one or more of the three phases of current or voltage that is supplied to a three-phase alternating current (AC) motor. In another example, the motor electrical signature can be a time-varying inductance characteristic of the motor. Alternatively, another type of signature can be generated based on the energy that is supplied to the motor.

Once a motor is identified as having a faulty motor, bearing, gear, or the like, based on examination of the electrical signature(s) at the designated operating conditions, one or more embodiments of the systems and methods described herein may take additional responsive actions. For example, upon identification of a potential mechanical failure of a motor, a control signal may be generated that is communicated to a controller of the vehicle system that controls the tractive efforts and/or braking efforts (e.g., retarding efforts) provided by the vehicle system that includes the motor. The control signal may automatically change the tractive efforts and/or retarding efforts, such as by slowing down or stopping movement of the vehicle. Alternatively, the control signal may provide a notification to an operator of the vehicle (e.g., instructions that are displayed on a display device) that instructs the operator to slow down or stop movement of the vehicle. In another embodiment, the control signal may include an alarm signal that notifies and warns the operator of the identified impending mechanical failure. In another example, the output signal may be communicated to a location disposed off-board of the vehicle system, such as a dispatch center or a repair center that is remotely located from the vehicle. In response to receiving the output signal, the off-board location may schedule a maintenance operation for the vehicle system, such as a scheduled examination and/or repair to the motor associated with the impending mechanical failure that is identified. The off-board location may transmit a responsive signal to the vehicle system that controls the tractive efforts of the vehicle system, or instructs an operator of the vehicle system to change the tractive efforts of the vehicle system, to stop the vehicle system or cause the vehicle system to travel to a designated maintenance facility where the motor can be examined and/or repaired. In one embodiment, the output signal from the vehicle system may include information related to the maintenance operation to be performed on the motor, such as a potential identification of the motor and/or of a bearing or gear that may be the cause of the impending mechanical failure that is identified.

Figure 1:
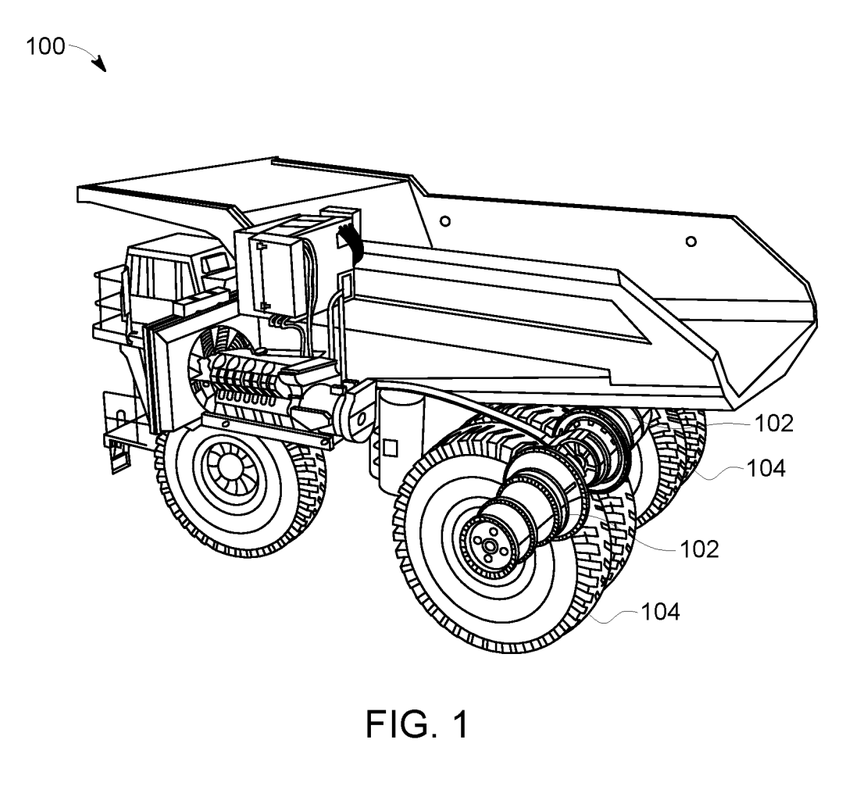
FIG. 1 illustrates one embodiment of a vehicle system.

FIG. 1 illustrates one embodiment of a vehicle system 100. The vehicle system 100 represents an OHV, such as a mining haul truck, having a propulsion system that includes one or more traction motors 102, alternators, transmission gearings, etc., operably connected with wheels 104 of the vehicle system 100. The motors 102 may be operably connected with the wheels 104 by gears or the like. The motors 102 are powered by electric current received from a power source, such as an alternator of the vehicle system 100. In operation, the motors 102 receive current from the power source and rotate the wheels 104 to propel the vehicle system 100. If a motor 102 (or gears to which the motor 102 is connected) is damaged, then an electrical signature of the current and/or voltage supplied to that motor 102 may include peaks representative of the damage, as described herein. Not all embodiments of the subject matter described herein are limited to mining vehicles, however. For example, one or more embodiments of the subject matter described herein may be used with other vehicles, such as rail vehicles, electric automobiles, marine vessels, stationary power-generating systems, or the like.

Figure 2:
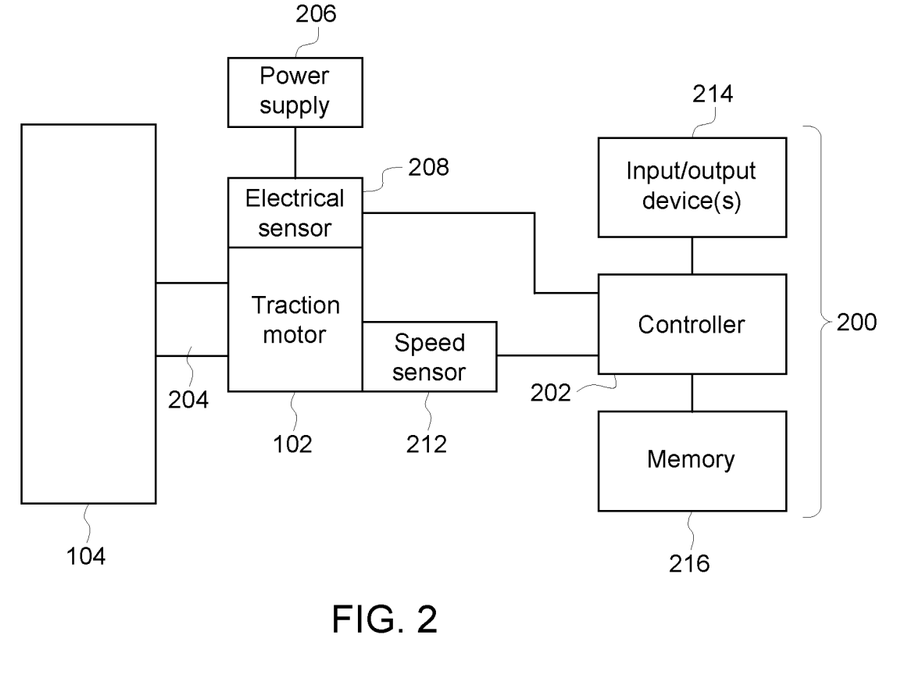
FIG. 2 illustrates a schematic diagram of one embodiment of a monitoring system.

FIG. 2 illustrates a schematic diagram of one embodiment of a monitoring system 200. The monitoring system 200 can be used to monitor the health of the propulsion system of vehicle systems 100, such as by determining whether motors, bearings, gears, alternators, or the like, of the propulsion system are damaged and/or whether mechanical couplings 204 between the motors 102 and wheels 104 are damaged. The mechanical couplings 204 can represent gears, axles, or the like, that transfer rotation of the motor 102 to rotation of the wheel 104. The monitoring system 200 includes a controller 202, which can represent hardware circuitry that includes and/or is connected with one or more processors (e.g., microprocessors, integrated circuits, application specific integrated circuits, field programmable gate arrays, or other electronic logic-based devices) that perform the operations described herein. In one aspect, the controller 202 may include a computing device that is specially programmed to monitor operation of the vehicle system 100 and/or motors 102 in order to identify damage to the motors 102 and/or associated gears, bearings, etc.

The controller 202 optionally may control operation of the vehicle system 100, such as by controlling the torque and/or speed of the motors 102 (e.g., based on operator input). The controller 202 may be manually controlled by an operator and/or automatically controlled. For example, the controller 202 may change operating speeds and/or torques of one or more of the motors 102 based on a manually adjustable throttle and/or may automatically change operating speeds of one or more of the motors 102 based on detection of damage to the motor 102, such as a motor 102 that is identified by the system 100 as likely having one or more failed components (e.g., bearings) and that may require service relatively soon.

The monitoring system 200 can be disposed onboard the vehicle system 100, and/or may be retrofitted to an existing vehicle system 100. The monitoring system 200 monitors electrical energy that is supplied to the motors 102 by a power source 206. While only one motor 102 and wheel 104 are shown in FIG. 2, the monitoring system 200 may concurrently monitor electrical energy supplied to multiple motors 102 by the same or different power sources 206. The power source 206 is an assembly that generates electric current or voltage, such as an engine coupled with an alternator or generator, a battery, or the like. The current or voltage is supplied to the motors 102 to cause the motors 102 to rotate. In one embodiment, the power source 206 provides an alternating current that is supplied to the motors 102 as a three-phase alternating current, such as an alternating current that includes three phases of the current that are offset from each other.

One or more electrical sensors 208 may be coupled with or disposed near the power source 206 and/or motor 102 to measure one or more characteristics of the electrical energy that is provided to the motor 102 from the power source 206. In one embodiment, the electrical sensor 208 includes a current sensor that measures the electric current supplied to the motor 102 as a characteristic of the electric energy that is supplied to the motor 102. The electrical sensor 208 can monitor different phases of an alternating current that is fed to the motor 102. Alternatively, the electrical sensor 208 may be a voltage sensor that measures the voltages that are supplied to the motor 102 from the power source 206. In another embodiment, the electrical sensor 208 may be another sensor that measures another electric characteristic of the energy that is delivered from the power source 206 to the motor 102, such as inductances, impedances, resistances, power (e.g., watts), and the like, of the electrical energy that is delivered to the motor 102 from the power source 206.

In one embodiment, the controller 202 may examine the currents and/or voltages measured by the one or more electrical sensors 208 to determine torques generated by the motor 102. For example, the torque generated by the motor 102 may be proportional to the current and/or voltage consumed by the motor 102 (and/or proportional to the efficiency of the motor 102 and inversely proportional to the rotational speed of the motor 102). Using the measured current and/or voltage, the controller 202 can calculate, estimate, or otherwise determine the torque of the motor 102.

One or more speed sensors 212 also may be coupled with or disposed near the motor 102 to measure speeds of the motor 102, such as the rotational speeds of the motor 102. The electrical characteristics, torques, and/or motors speeds can be communicated from the sensors 208, 210, 212 to the controller 202 via one or more wired and/or wireless connections.

One or more input and/or output devices 214 ("Input/Output Device(s)" in FIG. 2) may be disposed onboard the vehicle system 100. The input/output device 214 can include a monitor that visually presents information, a printer that prints information onto paper or another medium, a speaker that audibly presents information, a touchscreen that displays information and/or receives information, transceiving circuitry that communicates signals to off-board locations, an electronic mouse, a keyboard, stylus, or the like.

The system 200 includes a tangible and non-transitory computer-readable storage medium, such as a memory 216. The memory 216 may include a hard drive, flash drive, EEPROM, CD-ROM, DVD-ROM, and the like, that stores instructions that are readable by the controller 202. The instructions may direct the controller 202 to perform various operations. The memory 216 may store designated operating conditions, measured electrical characteristics, measured speeds, measured torques, electrical signatures, or the like, of the motor 102.

Figure 3:
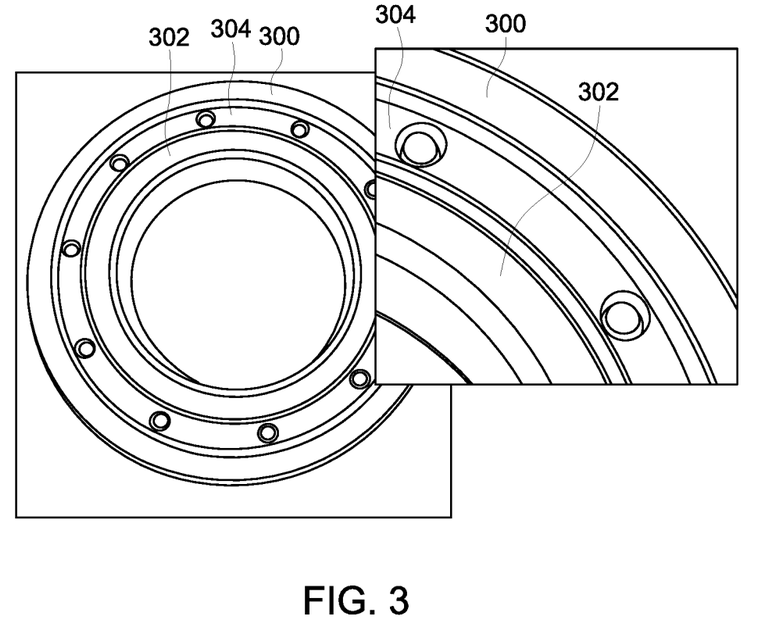
FIG. 3 illustrates a perspective view of raceways and a bearing cage of a propulsion system shown in FIG. 1 according to one example.

FIG. 3 illustrates a perspective view of raceways 300, 302 and a bearing cage 304 of the motor 102 shown in FIG. 1 according to one example. Also shown in FIG. 3 is a magnified view of a portion of the raceways 300, 302 and bearing cage 304. The bearing cage 304 holds several bearings that allow one or more of the raceways 300, 302 to rotate relative to each other. If the raceways 300, 302 and/or bearings 304 become damaged, then the monitoring system 200 can detect the damage based on the electrical signatures of the motor 102 without an operator having to take the motor 102 apart for a visual inspection.

FIGS. 4 through 9 illustrate electrical signatures 400, 500, 600, 700, 800, 900 for the same motor 102 operating using different operating conditions according to several examples. The electrical signatures shown in FIGS. 4 through 9 are frequency spectra of the electrical characteristics measured by the electrical sensor 208 during operation of the motor 102 in the different operating conditions. The signatures are shown alongside a horizontal axis 402 representative of frequencies and a vertical axis 404 representative of magnitudes of the various frequencies. Different electrical signatures may be determined for different sets of operating conditions. For example, a first electrical signature may be determined for a first motor speed and a first torque; a different, second electrical signature may be determined for a different, second motor speed and/or a different, second torque; and so on.

The electrical signatures may represent the characteristics measured for a single phase of the current supplied to the motor 102 in one embodiment. Similar signatures may be obtained or generated by the controller 202 for other phases of the current supplied to the motor 102. The following table indicates the operational conditions of the motor 102 for the different signatures in FIGS. 4 through 9:

| Signature | FIG. | Speed (rpm) | Torque (ft * lbs) |
|---|---|---|---|
| 400 | 4 | 225 | 10,000 |
| 500 | 5 | 225 | 15,000 |
| 600 | 6 | 300 | 5,000 |
| 700 | 7 | 300 | 10,000 |
| 800 | 8 | 300 | 15,000 |
| 900 | 9 | 350 | 10,000 |

Different frequencies within the signatures may be associated with different faults of the motor 102 and/or couplings 204. Additionally, peaks occur within the signatures at frequencies representative of the speeds at which the motor 102 is operating. The frequencies associated with the faults of the motor 102 and/or couplings 204 can be derived from the peaks that represent the motor speeds. For example, the signatures 400, 500 include fundamental frequency peaks 406, 506 at frequencies of 11.4 Hz and 11.9 Hz (which represent the rotational speed of the motor 102 of 225 rpm), the signatures 600, 700, 800 include fundamental frequency peaks 606, 706, 806 at frequencies of 15.3 Hz, 15.56 Hz, and 15.83 Hz (which represent the rotational speed of the motor 102 of 300 rpm), and the signature 900 includes a fundamental frequency peak 906 at a frequency of 18.03 Hz (which represents the rotational speed of the motor 102 of 350 rpm).

Based on the fundamental frequency peak for a signature, the controller 202 can determine additional fault frequencies. The fault frequencies represent frequencies at which peaks occur if damage to the motor 102 and/or couplings 204 is present. In one embodiment, the fault frequencies can be determined from:

$$f_s = |f_{fundamental} \pm k \cdot f_{bearing}| \quad \text{(Eqn. 1)}$$

where $f_s$ represents fault frequencies, $f_{fundamental}$ represents the fundamental frequency peak for the signature being examined, k represents one or more integer values (e.g., 1, 2, 3, etc.), and $f_{bearing}$ represents a frequency associated with damage to the motor 102 and/or couplings 204.

The frequency associated with damage to the motor and/or couplings may be determined from:

$$f_{bearing} = f_{desig} * \frac{v_{motor}}{\tau} \quad \text{(Eqn. 2)}$$

where $f_{desig}$ represents a designated frequency associated with one or more types of damage, $v_{motor}$ represents the measured rotational speed of the motor 102 (in rpm), and $\tau$ represents the measured torque of the motor 102 (in foot pounds). The designated frequency ($f_{desig}$) can vary based on the type of motor 102, type of damage, etc., and may be determined experimentally. In one embodiment, the designated frequency ($f_{desig}$) for a damaged bearing is 68.6 Hz, although one or more other frequencies may be used. As a result, the designated frequency ($f_{bearing}$) is 15.43 Hz, as determined from Equation #2 above.

Figure 4:
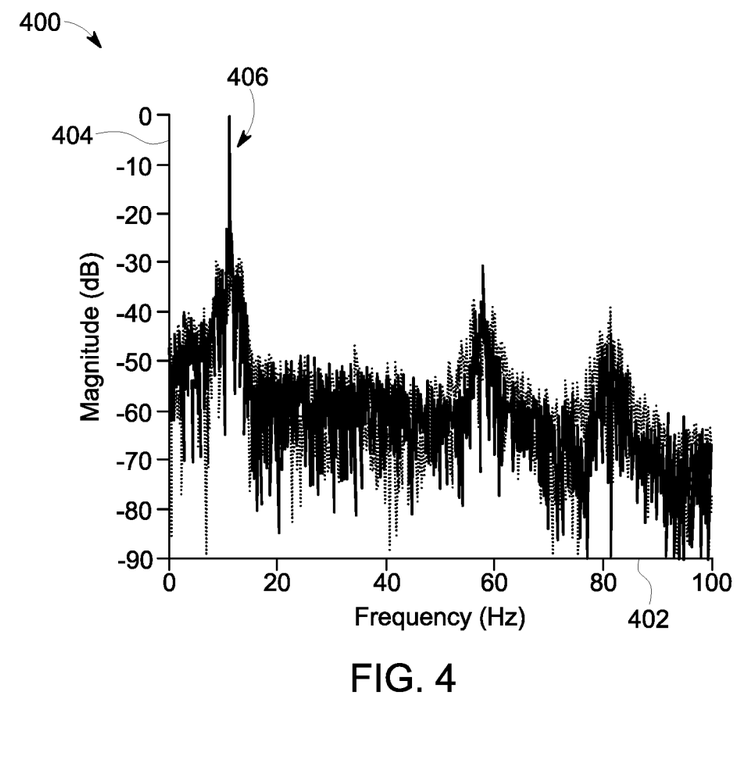
FIG. 4 illustrates an electrical signature for the propulsion system shown in FIG. 1 operating according to a first set of operating conditions according to one example.
Figure 5:
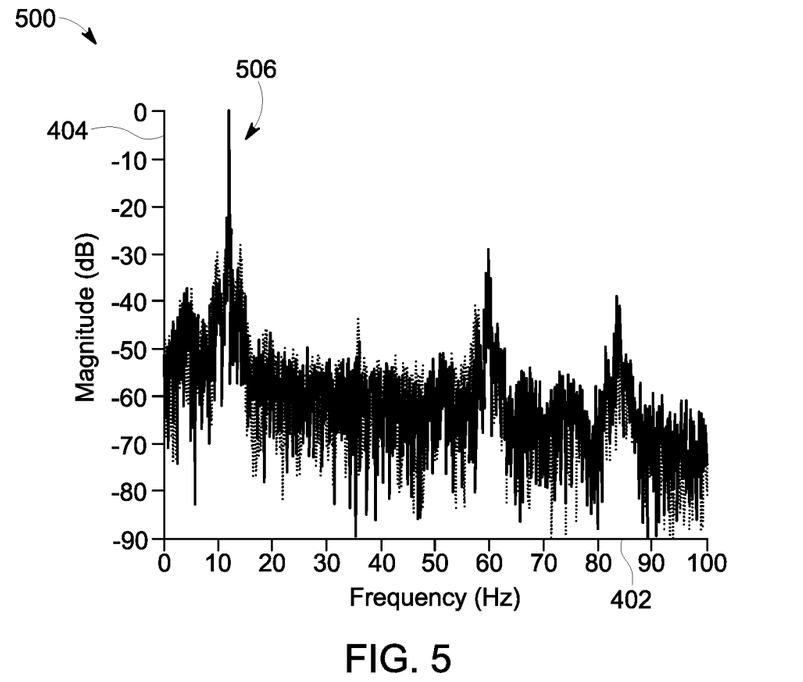
FIG. 5 illustrates an electrical signature for the propulsion system shown in FIG. 1 operating according to a second set of operating conditions according to one example.
Figure 6:
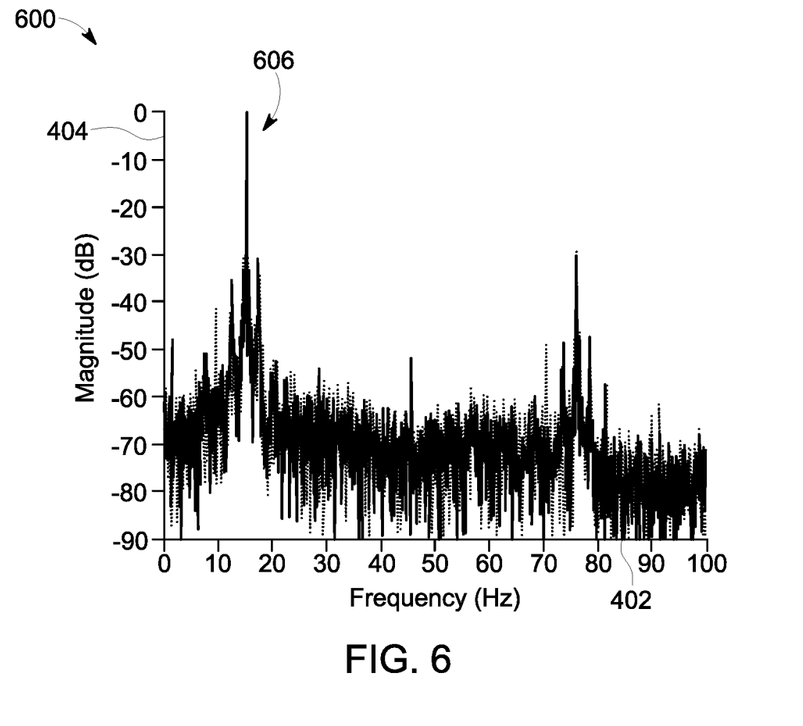
FIG. 6 illustrates an electrical signature for the propulsion system shown in FIG. 1 operating according to a third set of operating conditions according to one example.
Figure 7:
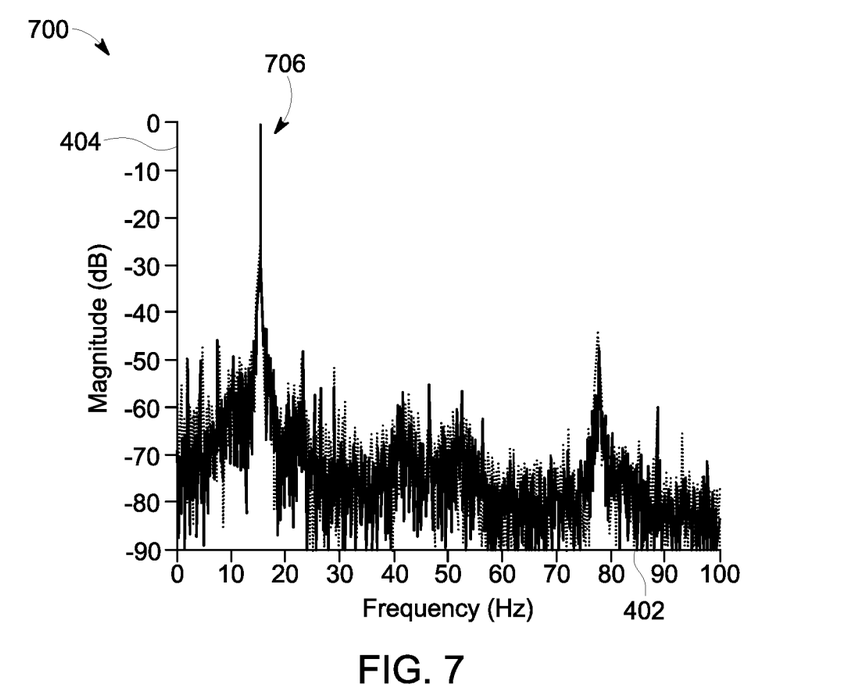
FIG. 7 illustrates an electrical signature for the propulsion system shown in FIG. 1 operating according to a fourth set of operating conditions according to one example.
Figure 8:
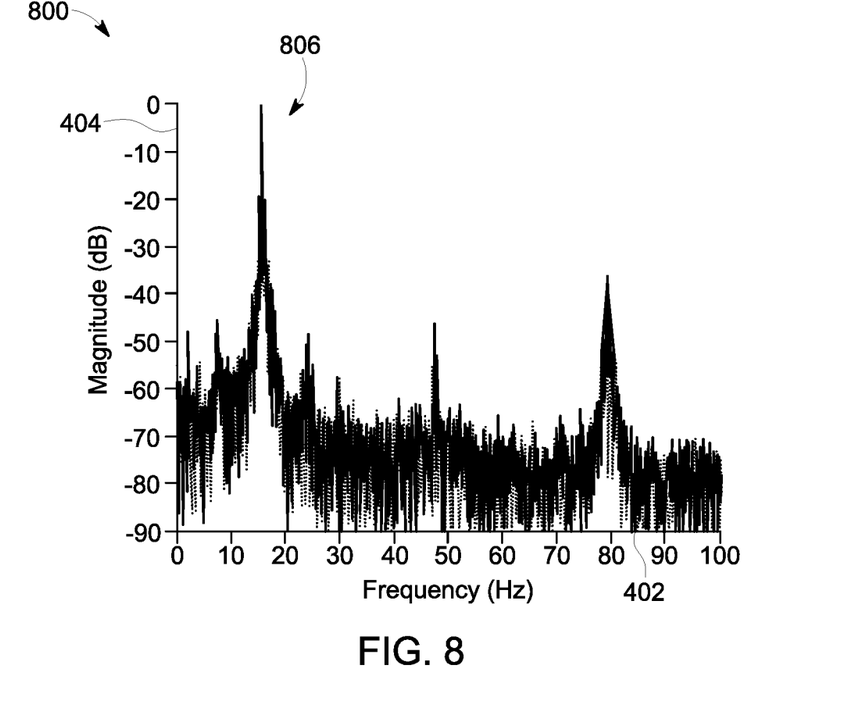
FIG. 8 illustrates an electrical signature for the propulsion system shown in FIG. 1 operating according to a fifth set of operating conditions according to one example.
Figure 9:
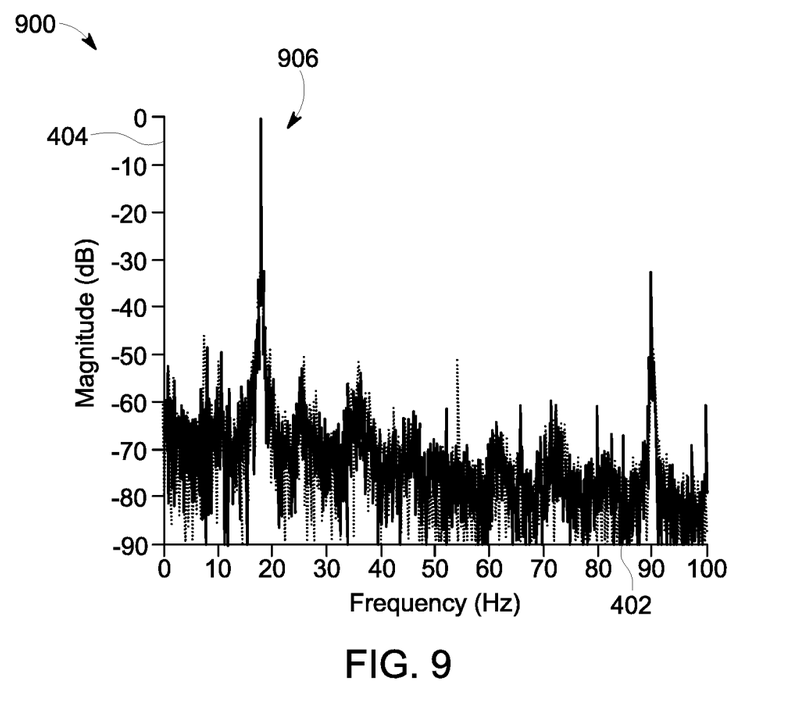
FIG. 9 illustrates an electrical signature for the propulsion system shown in FIG. 1 operating according to a sixth set of operating conditions according to one example.

In order to examine the signatures for damaged bearings, the controller 202 may examine the signatures at the fault frequencies to determine if one or more peaks are present in the signatures at one or more of the fault frequencies. For example, for the signature 400 (where the motor 102 operates at 225 rpm and produces 10,000 ft*lbs of torque and has a fundamental peak frequency of 11.4 Hz), the fault frequencies occur at absolute values of 11.4 Hz±k*15.3 Hz, such as the frequencies 9.14 Hz, 29.72 Hz, 32.0 Hz, etc. The table below lists several fault frequencies for different operating conditions of the motor 102 and different fundamental frequencies of the motors 102:

| Operating Conditions (rpm/ft * lbs) | Fundamental Frequency (Hz) | Fault Frequencies (Hz) |
|---|---|---|
| 225/5,000 | 11.4 | 4.00, 19.43, 26.86, 34.87, 42.30, 50.30, 57.73, 65.74, 73.17, 88.60, etc., |
| 225/10,000 | 11.7 | 3.76, 19.20, 27.10, 34.63, 42.53, 50.07, 57.97, 65.50, 73.40, 88.84, etc., |
| 225/15,000 | 11.9 | 3.50, 18.93, 27.36, 34.37, 42.80, 49.80, 58.23, 65.24, 73.67, 89.10, etc., |
| 300/5,000 | 15.3 | 5.28, 25.86, 35.88, 46.44, 56.46, 67.02, 77.04, 87.60, 97.62, 118.20, etc., |
| 300/10,000 | 15.56 | 5.28, 25.86, 35.88, 46.44, 56.46, 67.02, 77.04, 87.60, 97.62, 118.20, etc., |
| 300/15,000 | 15.83 | 4.74, 36.41, 25.32, 45.90, 56.99, 66.48, 77.57, 87.06, 98.15, 118.73, etc., |
| 350/10,000 | 18.03 | 5.97, 29.98, 42.04, 53.99, 66.05, 78.0, 90.06, 102.01, 114.07, 138.08, etc., |

The controller 202 may examine the electrical signatures associated with different operating conditions at the corresponding fault frequencies to determine if a peak exists at or near (e.g., within a designated range, such as 1 Hz, 0.5 Hz, or another value) the fault frequencies. If a peak exists, then the controller 202 may determine that the motor 102 and/or couplings 204 are damaged. Otherwise, the controller 202 may determine that the signature does not indicate that the motor 102 and/or couplings 204 are damaged.

In operation, the monitoring system 200 may monitor operations of the vehicle system 100 during a baseline time period in order to determine baseline operating conditions. The baseline time period may include a time period where there is no damage to the motors 102, couplings 204, or the like, such as after manufacture, repair, inspection, etc., of the motors 102, couplings 204, or vehicle system 100. In one aspect, the baseline time period can include several days or weeks after the vehicle system 100 is first placed into service following manufacture of the vehicle system 100 or motors 102. During the baseline time period, the operating conditions of the vehicle system 100 are monitored. The operating conditions can include the speeds at which the motors 102 operate (as measured by the speed sensor 212) and the torques generated by the motors 102.

The controller 202 can monitor these operating conditions during the baseline time period and determine electrical signatures of one or more motors 102 using the electrical characteristics that are measured by the electrical sensor 208 when the various operating conditions are monitored. The controller 202 can examine the electrical signatures generated from electrical characteristics measured at different operating conditions of the vehicle system 100 to determine which operating conditions provide improved conditions for detecting damage to the motor 102 and/or couplings 204 relative to other operating conditions.

Some operating conditions result in electrical signatures that have less noise (e.g., less variations in magnitude) in portions of the signatures that are outside of (e.g., that do not include) the fundamental frequency and/or the fault frequencies than signatures obtained during different operating conditions. With respect to the signatures shown in FIGS. 4 through 9, the signatures 400, 800, 900 include smaller noise when compared to the signatures 500, 600, 700. The variances in the signatures 400, 800, 900 are smaller in the frequencies that do not include the fundamental or fault frequencies than the variances in the signatures 500, 600, 700 for the same frequencies. Accordingly, the controller 202 may select the operating conditions associated with the signatures 400, 800, 900 as designated operating conditions for examining the motor 102 and/or couplings 204. The operating conditions associated with the other signatures may not be selected as designated operating conditions. The designated operating conditions may be selected from the signatures generated based on electrical characteristics measured during the baseline time period. In the illustrated examples, the designated operating conditions include three sets of different operating conditions, with a first set including a motor speed of 225 rpm and a torque of 10,000 ft*lbs (e.g., the signature 400 shown in FIG. 4), a second set including a motor speed of 300 rpm and a torque of 15,000 ft*lbs (e.g., the signature 800 shown in FIG. 8), and a third set including a motor speed of 350 rpm and a torque of 10,000 ft*lbs (e.g., the signature 900 shown in FIG. 9).

Following the baseline time period, the controller 202 may continue to monitor the electrical characteristics of the current supplied to the motor 102 to identify damage to the motor 102 and/or couplings 204. In one embodiment, the controller 202 may monitor the operating conditions of the motor 102 to determine whether the current operating conditions are the same as or within a designated range of (e.g., within 1%, 3%, 5%, or another limit) the designated operating conditions in one or more sets of the designated operating conditions. For example, the controller 202 may monitor the operating conditions to determine when the motor 102 has a speed of 225 rpm and a torque of 10,000 ft*lbs, when the motor has a speed of 300 rpm and a torque of 15,000 ft*lbs, or when the motor has a speed of 350 rpm and a torque of 10,000 ft*lbs. Responsive to the motor 102 having operating conditions that match or correspond to one or more sets of designated operating conditions, the controller 202 may monitor the electrical characteristics of the motor 102, as measured by the electrical sensor 208. The controller 202 may examine these electrical characteristics to determine if one or more peaks or increased magnitudes in a signature formed by the characteristics occur at a fault frequency. If such a peak is identified, then the controller 202 may identify damage to the motor 102 and/or coupling 204 and generate a signal to implement a responsive action, as described above.

In another embodiment, the controller 202 may monitor the electrical characteristics and the operating conditions of the motor 102 to determine whether the current operating conditions are the same as or within a designated range of the designated operating conditions in one or more sets of the designated operating conditions. Responsive to the motor 102 having operating conditions that match or correspond to one or more sets of designated operating conditions, the controller 202 may separate the electrical characteristics of the motor 102 measured by the electrical sensor 208 while the motor 102 operated using the designated operating conditions from the electrical characteristics measured during the motor 102 operating using other operating conditions. The controller 202 may examine these electrical characteristics to determine if one or more peaks or increased magnitudes in a signature formed by the characteristics occur at a fault frequency. If such a peak is identified, then the controller 202 may identify damage to the motor 102 and/or coupling 204 and generate a signal to implement a responsive action, as described above.

The designated operating conditions may be determined to be the same for several vehicle systems 100 and/or motors 102. For example, the same designated operating conditions may be used for the same type of motors 102 (e.g., motors having the same fabrication, number of windings, size, horsepower rating, etc.). Alternatively, the designated operating conditions may be individualized for different vehicle systems 100. For example, the designated operating conditions may be determined separately and differently for each vehicle system 100, and the designated operating conditions may be used for the motors 102 of that vehicle system 100, but not for the motors 102 of other vehicle systems 100. Alternatively, the designated operating conditions may be individualized for different motors 102. For example, the designated operating conditions may be determined separately and differently for each motor 102 in a vehicle system 100, and different motors 102 in the same vehicle system 100 may use different designated operating conditions to determine damage to the motors 102 and/or couplings 204.

Figure 10:
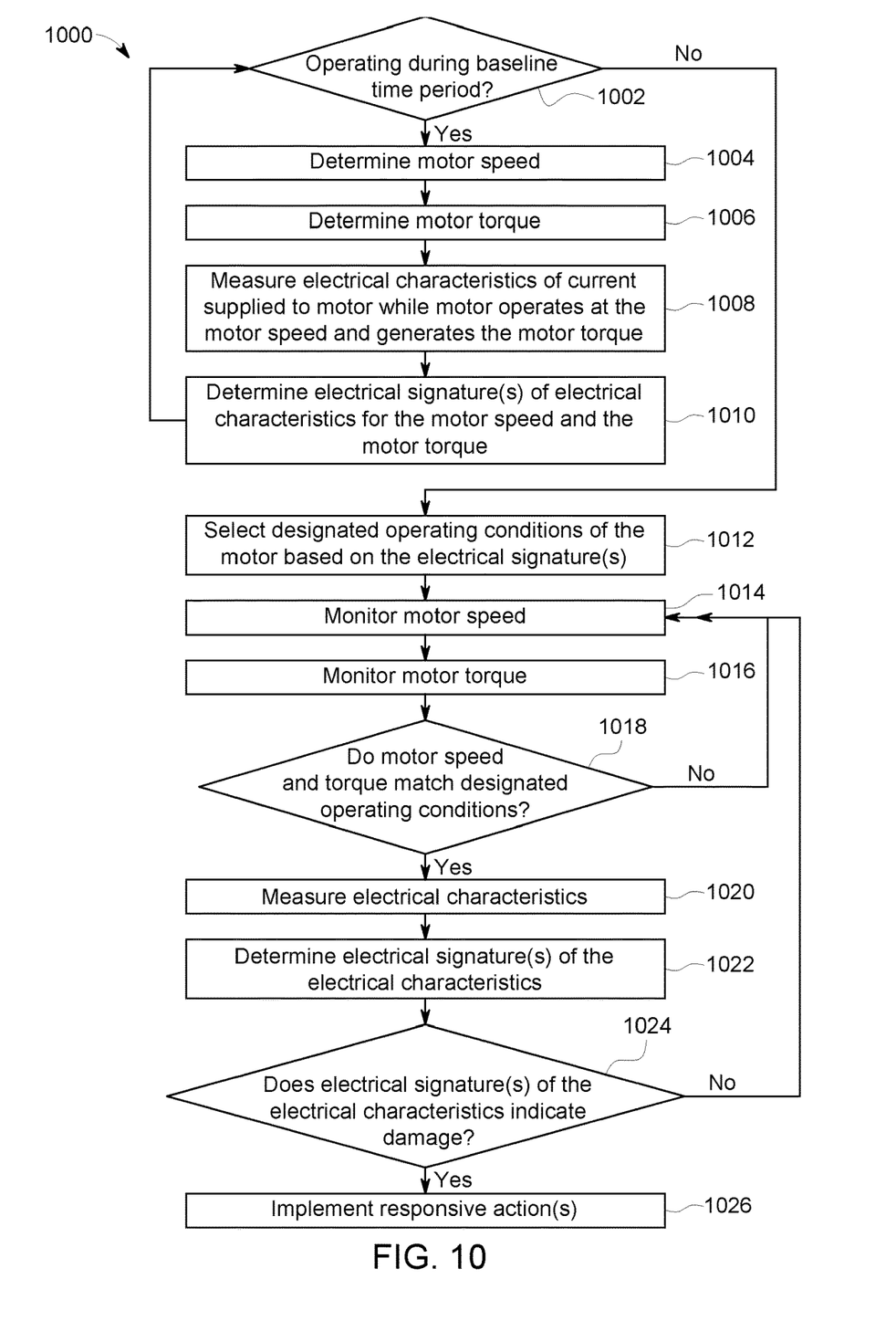
FIG. 10 illustrates a flowchart of one embodiment of a method for monitoring a vehicle system and/or a propulsion system of the vehicle system.

FIG. 10 illustrates a flowchart of one embodiment of a method 1000 for monitoring a vehicle system 100 and/or a motor 102 of the vehicle system. The method 1000 may be used to monitor the health of the motor 102 and/or couplings 204, such as to identify a damaged bearing, raceway, gear, or the like, of the motor 102 and/or couplings 204. In one aspect, the method 1000 may represent or be used to create a software application that directs operations of the controller 202, as described above. While the description of the method 1000 focuses on monitoring a single motor, the method 1000 may be used to concurrently monitor multiple motors.

At 1002, a determination is made as to whether the vehicle system and/or motor are operating during a baseline time period. As described above, the baseline time period includes a duration of time where the operating conditions of the vehicle system 100 and/or motor 102, and electrical characteristics of the motor 102, are monitored to identify one or more sets of operating conditions that yield less noise or otherwise include more clear indications of motor damage in motor electrical signatures than other operating conditions.

If the vehicle system is operating during the baseline time period, then flow of the method 1000 can proceed toward 1004 to obtain the operating conditions and electrical characteristics. If the vehicle system is not operating during the baseline time period, then flow of the method 1000 can proceed toward 1012.

At 1004, motor speed(s) of the motor being monitored are measured. A speed sensor may measure the speeds at which the motor rotates. These speeds may be stored in the memory of the monitoring system. At 1006, motor torque(s) generated by the motor are determined. The torques may be determined based on the voltages and/or currents demanded by or supplied to the motor 102. At 1008, electrical characteristics of the current supplied to the motor are measured. The electrical characteristics are measured and associated with the operating conditions (e.g., the motor speeds and torques) occurring when the electrical characteristics are measured. The electrical characteristics may be stored in the memory and associated with the operating conditions in the memory.

At 1010, one or more electrical signatures of the electrical characteristics are determined. The signatures may include frequency domain spectra of the electrical characteristics of the current supplied to the motor. Different signatures may be generated for different operating conditions. For example, for different combinations of motor speed and torque, different signatures may be generated using the electrical characteristics that were measured when the motor was operating using the respective motor speed and torque combination.

Flow of the method 1000 may return toward 1002 to determine if the motor and/or vehicle system continue to operate during the baseline time period or if the baseline time period has expired. If the baseline time period continues, then additional electrical characteristics and operating conditions may be monitored to determine additional electrical signatures associated with different operating conditions. If the baseline time period has ended, then the electrical signatures can be examined to determine the operating conditions to use for monitoring the condition of the motor and/or vehicle system, as described herein.

At 1012, one or more sets of designated operating conditions of the motor are selected based on the electrical signatures that were determined. The signatures determined at 1010 can be examined to determine which signatures include less variation or noise at or near fault frequencies associated with the motor. For example, the range of magnitudes of electrical signatures at or near the fault frequencies may be examined for different signatures associated with different sets of operating conditions. One or more of the signatures having smaller changes in the magnitudes at or near the fault frequencies are selected, and the sets of operating conditions associated with those signatures are selected as designated operating conditions.

At 1014, speeds of the motor are monitored. For example, the speed sensor may measure different speeds at which the motor rotates to propel the vehicle system. At 1016, torques generated by the motor are monitored. For example, the controller may determine the torques based on the current and/or voltage supplied to the motor. At 1018, a determination is made as to whether a combination of the motor speed and torque matches one or more sets of designated operating conditions selected at 1012. A speed and torque combination may match a set of designated operating conditions when the motor speed is the same as or within a designated range (e.g., 1%, 3%, 5%, or the like) of a speed in a set of designated operating conditions and the torque is the same as or within the designated range of a torque in the same set of designated operating conditions. If the motor speed and torque matches a set of designated operating conditions, then flow of the method 1000 can proceed toward 1020. At 1020, electrical characteristics of the motor are measured during operation of the motor under the designated operating conditions. Alternatively, the electrical characteristics may be monitored while the motor is operating using the designated operating conditions and also while the motor is operating using other operating conditions, and the electrical characteristics measured while the motor is operating using the designated operating conditions are examined while other electrical characteristics are not examined. If, at 1018, the operating conditions do not match the one or more sets of designated operating conditions, then flow of the method 1000 may return toward 1014. For example, the motor speeds and torques can continue to be monitored to determine if and when the motor operates using designated operating conditions.

At 1022, one or more electrical signatures are determined from the electrical characteristics. The signatures can be determined using the electrical characteristics of the current supplied to the motor while the motor operates using one or more sets of designated operating conditions. The signatures can be frequency domain spectra of the electrical characteristics.

At 1024, a determination is made as to whether the electrical signatures indicate damage to the motor and/or couplings of the motor to a wheel or axle. The signatures can be examined to determine if the signatures include one or more peaks at or near fault frequencies. For example, if a signature includes a peak (e.g., an increase in the signature by at least a designated threshold amount, such as a 10%, 20%, 30%, or the like, increase) at a fault frequency, then the signature may indicate damage to the motor and/or couplings. As a result, flow of the method 1000 can proceed toward 1026. Otherwise, flow of the method 1000 can return toward 1014 for additional monitoring of motor speed and torque.

At 1026, one or more responsive actions are implemented. For example, upon identification of damage to the motor or couplings, a control signal may be generated by the controller that is used by the controller to control the tractive efforts and/or retarding efforts provided by the vehicle system that includes the motor. The control signal may automatically change the tractive efforts and/or retarding efforts, such as by slowing down or stopping movement of the vehicle. Alternatively, the control signal may provide a notification to an operator of the vehicle (e.g., instructions that are displayed on a display device) that instructs the operator to slow down or stop movement of the vehicle. In another embodiment, the control signal may include an alarm signal that notifies and warns the operator of the identified impending mechanical failure. In another example, the output signal may be communicated to a location disposed off-board of the vehicle system, such as a dispatch center or a repair center that is remotely located from the vehicle. In response to receiving the output signal, the off-board location may schedule a maintenance operation for the vehicle system, such as a scheduled examination and/or repair to the motor associated with the impending mechanical failure that is identified. The off-board location may transmit a responsive signal to the vehicle system that controls the tractive efforts of the vehicle system, or instructs an operator of the vehicle system to change the tractive efforts of the vehicle system, to stop the vehicle system or cause the vehicle system to travel to a designated maintenance facility where the motor can be examined and/or repaired. In one embodiment, the output signal from the vehicle system may include information related to the maintenance operation to be performed on the motor, such as a potential identification of the motor and/or of a bearing or gear that may be the cause of the impending mechanical failure that is identified.

In one embodiment, a method (e.g., for monitoring a propulsion system of a vehicle system) includes monitoring operating conditions of the vehicle system, determining whether the operating conditions of the vehicle system match designated operating conditions, examining an electrical signature representative of an electric current supplied to the propulsion system of the vehicle system responsive to determining that the operating conditions of the vehicle system that are monitored match the designated operating conditions, and identifying damage to the propulsion system of the vehicle system based on the electrical signature that is examined.

In one aspect, the operating conditions include a speed at which a motor of the propulsion system rotates.

In one aspect, the operating conditions include a torque generated by a motor of the propulsion system.

In one aspect, the operating conditions include both a speed at which a motor of the propulsion system rotates, and a torque generated by the motor.

In one aspect, the designated operating conditions include a designated speed at which a motor of the propulsion system rotates.

In one aspect, the designated operating conditions include a designated torque generated by a motor of the propulsion system.

In one aspect, the designated operating conditions include both a designated speed at which a motor of the propulsion system rotates, and a designated torque generated by the motor.

In one aspect, the electrical signature includes a frequency domain spectrum of one or more electrical characteristics of the current supplied to the propulsion system.

In one aspect, the damage is identified responsive to determining that the electrical signature includes an increased magnitude at one or more fault frequencies associated with the damage to the propulsion system.

In another embodiment, another method (e.g., for monitoring a propulsion system of a vehicle system) includes monitoring operating conditions of the propulsion system of the vehicle system during a baseline time period, monitoring one or more electrical characteristics of current supplied to the propulsion system during the baseline time period, examining one or more electrical signatures of the propulsion system to identify at least one electrical signature having reduced variances in magnitude at one or more frequencies associated with damage to the propulsion system, and determining one or more sets of designated operating conditions of the propulsion system based on the one or more electrical signatures that are examined. The one or more sets of designated operating conditions are used to determine which of subsequently monitored electrical characteristics of the current are to be examined to identify the damage to the propulsion system.

In one aspect, the operating conditions include a speed at which a motor of the propulsion system rotates.

In one aspect, the operating conditions include a torque generated by a motor of the propulsion system.

In one aspect, the operating conditions include both a speed at which a motor of the propulsion system rotates, and a torque generated by the motor.

In one aspect, the designated operating conditions include a designated speed at which a motor of the propulsion system rotates.

In one aspect, the designated operating conditions include a designated torque generated by a motor of the propulsion system.

In one aspect, the designated operating conditions include both a designated speed at which a motor of the propulsion system rotates, and a designated torque generated by the motor.

In one aspect, the one or more electrical signatures include a frequency domain spectrum of one or more electrical characteristics of the current supplied to the propulsion system.

In one aspect, the method also includes subsequently determining whether additional operating conditions of the vehicle system match the designated operating conditions of at least one of the sets of the one or more designated operating conditions, examining an additional electrical signature of the current supplied to the propulsion system responsive to determining that the additional operating conditions of the vehicle system match the designated operating conditions of the at least one of the sets, and identifying the damage to the propulsion system based on the additional electrical signature that is examined.

In another embodiment, a system (e.g., a monitoring system) includes one or more sensors and a controller. The one or more sensors are configured to measure operating conditions of a vehicle system. The controller is configured to determine whether the operating conditions of the vehicle system match designated operating conditions. The controller also is configured to examine an electrical signature representative of an electric current supplied to a motor of the vehicle system responsive to determining that the operating conditions of the vehicle system that are monitored match the designated operating conditions. The controller also is configured to identify damage to one or more of the motor of the vehicle system or a mechanical coupling of the motor to one or more of a wheel or axle of the vehicle system based on the electrical signature that is examined.

In one aspect, the operating conditions include a speed at which the motor rotates.

In one aspect, the operating conditions include a torque generated by the motor.

In one aspect, the operating conditions include both a speed at which the motor rotates, and a torque generated by the motor.

In one aspect, the designated operating conditions include a designated speed at which the motor rotates.

In one aspect, the designated operating conditions include a designated torque generated by the motor.

In one aspect, the designated operating conditions include both a designated speed at which the motor rotates, and a designated torque generated by the motor.

In one aspect, the electrical signature includes a frequency domain spectrum of one or more electrical characteristics of the current supplied to the motor.

In one aspect, the controller is configured to identify the damage responsive to determining that the electrical signature includes an increased magnitude at one or more fault frequencies associated with the damage to the one or more of the motor or the mechanical coupling.

In another embodiment, another system (e.g., a monitoring system) includes one or more sensors and a controller). The one or more sensors are configured to measure operating conditions of a motor of a vehicle system during a baseline time period. The controller is configured to monitor one or more electrical characteristics of current supplied to the motor during the baseline time period, and to examine one or more electrical signatures of the motor to identify at least one electrical signature having reduced variances in magnitude at one or more frequencies associated with damage to one or more of the motor or a mechanical coupling of the motor to one or more of a wheel or an axle of the vehicle system. The controller is configured to determine one or more sets of designated operating conditions of the motor based on the one or more electrical signatures that are examined. The one or more sets of designated operating conditions are used by the controller to determine which of subsequently monitored electrical characteristics of the current are to be examined to identify the damage to the one or more of the motor or the mechanical coupling of the motor.

In one aspect, the operating conditions include a speed at which the motor rotates.

In one aspect, the operating conditions include a torque generated by the motor.

In one aspect, the operating conditions include both a speed at which the motor rotates, and a torque generated by the motor.

In one aspect, the designated operating conditions include a designated speed at which the motor rotates.

In one aspect, the designated operating conditions include a designated torque generated by the motor.

In one aspect, the designated operating conditions include both a designated speed at which the motor rotates, and a designated torque generated by the motor.

In one aspect, the one or more electrical signatures include a frequency domain spectrum of one or more electrical characteristics of the current supplied to the motor.

In one aspect, the controller also is configured to subsequently determine whether additional operating conditions of the vehicle system match the designated operating conditions of at least one of the sets of the one or more designated operating conditions. The controller also is configured to examine an additional electrical signature of the current supplied to the motor responsive to determining that the additional operating conditions of the vehicle system match the designated operating conditions of the at least one of the sets and to identify the damage to the one or more of the motor or the mechanical coupling of the motor based on the additional electrical signature that is examined.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to one of ordinary skill in the art upon reviewing the above description. The scope of the subject matter described herein should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the invention, including the best mode, and also to enable any person of ordinary skill in the art to practice the embodiments disclosed herein, including making and using any devices or systems and performing any incorporated methods. The patentable scope of the subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A method comprising:
   determining whether measured operating conditions of a vehicle system match at least one of plural different sets of designated operating conditions, the measured operating conditions of the vehicle system including a motor speed and a motor torque, the different sets of the designated operating conditions including different combinations of different designated motor speeds and different motor torques;
   responsive to determining that the measured operating conditions of the vehicle system match at least one of the different sets of the designated operating conditions, determining one or more fault frequencies associated with the at least one of the different sets of the designated operating conditions that match the measured operating conditions of the vehicle system;
   determining whether a frequency peak of an alternating current (AC) that is fed to a motor of the vehicle system matches the one or more fault frequencies associated with the at least one of the different sets of the designated operating conditions that matches the measured operating conditions of the vehicle system;
   determining a mechanical fault of the motor responsive to determining that the frequency peak of the AC matches the one or more fault frequencies associated with the at least one of the different sets of the designated operating conditions; and changing movement of the vehicle system responsive to the mechanical fault being determined.

2. The method of claim 1, wherein the frequency peak of the AC is determined for a single phase of the AC that is fed to the motor.

3. The method of claim 1, wherein the motor operates to propel the vehicle system.

4. The method of claim 1, wherein the mechanical fault that is determined is a failed bearing of the motor.

5. The method of claim 1, wherein the mechanical fault that is determined is a failed gear that is rotated by the motor.

6. The method of claim 1, wherein the movement of the vehicle system is changed by slowing or stopping the movement of the vehicle system.

7. A system comprising:

one or more processors configured to determine whether measured operating conditions of a vehicle system match at least one of plural different sets of designated operating conditions, the measured operating conditions of the vehicle system including a motor speed and a motor torque, the different sets of the designated operating conditions including different combinations of different designated motor speeds and different motor torques, the one or more processors configured to determine one or more fault frequencies associated with the at least one of the different sets of the designated operating conditions that match the measured operating conditions of the vehicle system responsive to determining that the measured operating conditions of the vehicle system match at least one of the different sets of the designated operating conditions, the one or more processors configured to determine whether a frequency peak of an alternating current (AC) that is fed to a motor of the vehicle system matches the one or more fault frequencies associated with the at least one of the different sets of the designated operating conditions that matches the measured operating conditions of the vehicle system, the one or more processors configured to determine a mechanical fault of the motor responsive to determining that the frequency peak of the AC matches the one or more fault frequencies associated with the at least one of the different sets of the designated operating conditions, the one or more processors configured to change movement of the vehicle system responsive to the mechanical fault being determined.

8. The system of claim 7, wherein the one or more processors are configured to determine the frequency peak of the AC for a single phase of the AC that is fed to the motor.

9. The system of claim 7, wherein the motor operates to propel the vehicle system.

10. The system of claim 7, wherein the one or more processors are configured to determine the mechanical fault as a failed bearing of the motor.

11. The system of claim 7, wherein the one or more processors are configured to determine the mechanical fault as a failed gear that is rotated by the motor.

12. The system of claim 7, wherein the one or more processors are configured to change the movement of the vehicle system by slowing or stopping the movement of the vehicle system.

13. A system comprising:

one or more sensors configured to measure operating conditions of a vehicle system; and a controller configured to determine whether the operating conditions of the vehicle system match designated operating conditions, the controller also configured to examine an electrical signature representative of an electric current supplied to a motor of the vehicle system responsive to determining that the operating conditions of the vehicle system that are monitored match the designated operating conditions, the controller also configured to identify damage to one or more of the motor of the vehicle system or a mechanical coupling of the motor to one or more of a wheel or axle of the vehicle system based on the electrical signature that is examined, the controller configured to slow or stop movement of the vehicle system responsive to identifying the damage.

14. The system of claim 13, wherein the operating conditions include a speed at which the motor rotates.

15. The system of claim 13, wherein the operating conditions include a torque generated by the motor.

16. The system of claim 13, wherein the operating conditions include both a speed at which the motor rotates, and a torque generated by the motor.

17. The system of claim 13, wherein the designated operating conditions include a designated speed at which the motor rotates.

18. The system of claim 13, wherein the designated operating conditions include a designated torque generated by the motor.

19. The system of claim 13, wherein the designated operating conditions include both a designated speed at which the motor rotates, and a designated torque generated by the motor.

20. The system of claim 13, wherein the electrical signature includes a frequency domain spectrum of one or more electrical characteristics of the current supplied to the motor.

* * * * *